United States Patent [19]

Pardee et al.

[11] 3,928,673

[45] Dec. 23, 1975

[54] RELEASE AND LUBRICATING COMPOSITION FOR GLASS MOLDS AND METHOD AND APPARATUS UTILIZING SUCH COMPOSITION

[75] Inventors: Robert P. Pardee; Thomas J. Loran; Archie L. Bickling, Jr.; Richard E. Brown, all of Boulder, Colo.

[73] Assignee: Ball Brothers Research Corporation, Boulder, Colo.

[22] Filed: Aug. 16, 1973

[21] Appl. No.: 388,847

[52] U.S. Cl. .................. 427/135; 65/24; 65/26; 252/29; 427/299; 427/379; 427/409
[51] Int. Cl.² .................. B28B 7/36; B28B 7/38
[58] Field of Search ............... 117/5.3; 65/24, 26; 252/12, 29; 260/37 N; 427/135, 379

[56] References Cited
UNITED STATES PATENTS

| | | | |
|---|---|---|---|
| 2,246,463 | 6/1941 | Garratt | 117/5.3 |
| 3,179,631 | 4/1965 | Endrey | 260/37 N X |
| 3,179,634 | 4/1965 | Edwards | 260/37 N X |
| 3,347,650 | 10/1967 | Barkhau | 65/26 |
| 3,480,422 | 11/1969 | Lichok et al. | 65/24 X |
| 3,495,962 | 2/1970 | Norton et al. | 252/29 X |
| 3,518,219 | 6/1970 | Lavin et al. | 260/37 N X |
| 3,629,103 | 12/1971 | Gubkina et al. | 252/12 |
| 3,655,607 | 4/1972 | Bockstie | 260/37 N X |

*Primary Examiner*—Michael R. Lusignan
*Assistant Examiner*—Dennis C. Konopacki
*Attorney, Agent, or Firm*—Gilbert E. Alberding

[57] ABSTRACT

Release and lubricating composition for avoiding seizure between molten glass and metal molds for forming glass articles, for minimizing wear between mold sections and for improving the pack of glassware, comprising, a dispersion of graphite in a polyimide resin, molds having such composition coated thereon, and a method of applying the composition to molten glass contacting surfaces comprising dispersing the composition in a solvent, applying the dispersed composition to the glass contacting surface and then baking the coating at an elevated temperature.

8 Claims, No Drawings

RELEASE AND LUBRICATING COMPOSITION FOR GLASS MOLDS AND METHOD AND APPARATUS UTILIZING SUCH COMPOSITION

BACKGROUND OF THE INVENTION

1. Field of the Invention

The present invention relates generally to glass forming, and more particularly to preventing seizure and sticking of molten glass to metal molten glass contacting forming molds as, for instance, glassware-forming molds, and lubrication of such forming mold under extreme temperatures.

2. Description of the Prior Art

It is well known to form glass by shaping highly viscous, molten glass in metal forms or molds until the glass cools sufficiently to maintain the induced form. One particularly demanding process for forming glass is the formation of glassware such as bottles. In this process, a gob of molten glass is typically first formed by a blank mold into a parison having a finish portion corresponding to the neck portion of the desired glassware. A neck ring engaging the finish portion of the parison is utilized to transport and place the parison in a blow mold, which is distinct from the blank mold, wherein blowing and cooling wind is conducted to the interior of the parison to force it into conformity with the blow mold and thereby to form the glassware.

Since molten glass will adhere to mold metal, and since the various mold sections will quickly wear if not lubricated, it is necessary to supply a release and lubricating agent to the molds. However, the glassware-forming process is unusually demanding of release agents and lubricating agents used in conjunction with the process in that much of the heat from the molten glass is carried off through the metal molds in order to lower the surface temperature and increase the viscosity of the formed glassware to that which permits the glassware to be self-supporting. Thus, since the molten glass is initially at a temperature of 1800° to 2200° F., and since the metal mold is usually not below about 750° to 975° F., it will be appreciated that a parting agent interposed between the molten glass and the metal mold will be subjected to most extreme heat stresses. However, the molten glass will stick to the mold if the release agent is vaporized, and the mold parts will wear rapidly if the lubricating agent is not maintained.

Heretofore, a "dope," typically a dispersion of graphite in a light petroleum produce such as kerosene, has been applied periodically by hand-held swab sticks to prevent sticking of glass to metal molds and to provide lubrication of the interacting mold sections. The drawbacks of this composition and application approach are numerous. Since the glass molds are at an elevated temperature, the petroleum product quickly flashes off into the atmosphere and coats the surrounding equipment with a grimy film. Since the application of the dope must be regularly repeated on the order of four to six or more times per hour, it is necessary for the operator to deftly swab the graphite and kerosene mixture onto the molds while the machinery is operating. While "Independent Section" machine operators are highly skilled personnel and such a process has been carried out with only most infrequent injury to personnel or damage to the machine, such close interaction of complex machinery and operating personnel is not desirable.

The petroleum product flashed off from the mold constitutes as environmental and fire hazard. Attempts to collect the vapors with hoods have often resulted in fires from the condensation of oils in the vicinity of molten glass. Venting of the hydrocarbons to the atmosphere is, of course, not desirable.

Production of glassware is also adversely affected by the use of the petroleum oils, graphite-swabbing composition. When the petroleum product flashes off, it lowers the temperature of the mold thereby increasing the possibility of "check" defects in the glassware formed immediately after swabbing. Further, the first several articles formed after swabbing commonly have graphite particles embedded therein and must be rejected by inspectors as defective glassware. This results in a loss of pack or efficiency on the order of three percent or more of the glassware.

Use of water-base carriers in place of the petroleum carriers for graphite, and other materials, have not been satisfactory partly as a result of the high heat of varporization of water and the resulting frequent cooling of the molds. Also, it is difficult to "wet" the heated mold surface with water-base materials which were applied during production. Objectionable odor problems have marked the use of certain other proposed mold lubricants.

Further discussion of the long-existing problems with swabbing of molds and the efforts to avoid or live with these problems can be found in U.S. Pat. Nos. 3,141,752, 3,480,422, 3,508,893, 3,523,016 and 3,623,856.

As might be expected, the above enumerated drawbacks and inefficiencies attendant to the dispersion of graphite in a petroleum base has led to numerous efforts to replace this composition with a more advantageous swabbing or parting agent. Except for narrow and marginal successes under the less extreme of normal operating conditions, no suitable compounds have heretofore been known.

Examples of otherwise excellent lubricants and parting agents which have been tested in the demanding environment of glassware production and found to be inadequate include water soluable graphite pastes, high-velocity impingement with graphite and/or molybdenium disulfide and a binder and aqueous and/or alcohol-base swabs. Some minor previous success has been obtained with coatings for six to eight hour runs, but these have proven to be extremely difficult to apply and have not provided reproducible results.

While at first blush, it would appear that, with the existence of and knowledge of tens of thousands of different lubricants, determining a satisfactory system for glass molds would be within the skill of the art. However, as discussed in U.S. Pat. No. 3,495,962, at Column 2, lines 4 through 34, the extreme conditions and varying, somewhat incompatible, requirements of glassware-forming molds have stymied the art. At the present, the above-discussed oil and graphite swabbing dope is almost universally used.

U.S. Pat. No. 2,052,629 further discusses glass mold lubricants and release agents.

SUMMARY OF THE INVENTION

The present invention, which provides a heretofore unavailable improvement over previously used swabbing dispersions, comprises a composition of graphite and polyimide binder, a method of applying the composition, and surfaces treated with the composition. Instead of periodic application of the swabbing compound, the composition of the instant invention is effective for the average functional life of glassware molds. This avoids exposure of the operator to the moving parts of the glass-forming machine and loss of pack and efficiency resulting from periodic inclusion of graphite in the glassware surface as with conventional swabbing. Also, contamination of the surrounding machinery and the atmosphere with odorous or oily fumes is avoided.

Accordingly, an object of the present invention is to provide an improved parting and lubrication system for glassware molds.

Another object of the present invention is to provide a parting and lubrication system which provides extended effectiveness thereby avoiding or minimizing periodic swabbing or treatment of the molds during production.

Yet another object of the present invention is to provide an improved parting and lubrication system to improve the pack of glassware form.

Still another object of the present invention is to provide a parting and lubricating system which affords improved safety to the operator of the glassware-forming apparatus.

Yet another object of the present invention is to provide a parting and lubrication system for glassware molds which may be conveniently applied away from and prior to the production process.

Yet still another object of the present invention is to provide a lubrication system for glassware molds which lubricates the more stressed portions of the glassware molds, such as the neck rings or blank mold, for an extended period of time.

Still another object of the present invention is to provide a glassware-parting and lubrication system which obviates contamination of machines and the atmosphere with odorous or oily fumes from a swabbing compound.

These and other object and features of the present invention will become apparent from the following description.

DETAILED DESCRIPTION OF THE INVENTION

According to the present invention, glassware-forming molds are treated with a release and lubricating composition comprising a polyimide and graphite dispersed in a carrier and, optionally, including additives such as antimony trioxide, or other constituents to improve the oxidation resistance, thermal resistance and wear resistance of the composition.

Typically, the composition may be comprised of 10% to 90% by weight of polyimide or precursor thereof and 10% to 90% by weight of graphite with 0% to 50% by weight of additive constituents. A preferred composition includes 35.5% by weight of polyimide resin, 35.5% by weight of graphite and 29.0% by weight of antimony trioxide.

Polyimides are well known. Generally, a preferred binder is an aromatic polyimide having a repeating group,

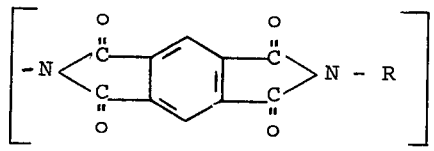

wherein "R" is an aromatic group and preferably

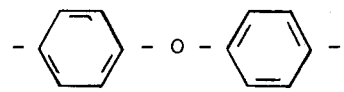

Since fine binder particles or precursors undergo cross-linking or polymerization during the heat curing period, exact molecular weight is not a particularly critical aspect of the invention. It may be assumed that, after curing, the polyimide cross-links into a very high molecular weight composition.

Graphite is, of course, a well-known lubricant. Either natural or synthetic forms of graphite can be satisfactorily employed in the present invention. While particle size is not critical, particle sizes between about 10 and 200 microns are useful, and preferably particle sizes less than about 72 microns should be employed to produce a desirable smooth coating.

Additive constituents which may be advantageously, but optionally, included are compounds to improve oxidation resistance of the composition, thermal stability and/or conductivity of the composition and wear resistance of the composition. Antimony trioxide is a particularly preferred additive in that the oxidation and wear resistance of the composition are markedly improved through use of this compound. Other useful additives include arsenous oxide and bismuth trioxide.

To facilitate application of the composition, a carrier system of organic solvent or solvents for polyimide is utilized. While not critical, operable solvents include N-methylpyrrolidone, mixtures of N-methylpyrrolidone, xylene and other aromatic solvents, ethanol, isopropanol, butanol and ethylene glycol. Those skilled in the art will readily recognize numerous other carriers and solvents which are equally suitable. Since the carrier system is essentially a passive aspect of the invention, it will be recognized that the combinations and permutations of solvents are almost unlimited.

Preparation of the metal surface of the mold prior to coating usually consists of degreasing, light abrasion and a final solvent purge of the surface to remove all abrasive particles and contaminants. If desired, chemical conversion coatings such as phosphate coatings may be used, but satisfactory results are obtainable with a clean mold metal surface. A slight roughness of the mold's surface, as is conventional in the art, is generally also desirable with the present invention.

The composition of the present invention dissipated or dissolved in a suitable carrier system may be applied to the prepared mold system by any of the conventional means such as brushing, spraying, dipping, or blowing onto the surface. Spraying is preferred.

After a uniform and smooth, thin coating is produced on the metal surface, the mold is preferably baked first at a low temperature to remove the solvent and thereafter at an elevated temperature to remove any remaining volatile constituents and to set the polyimide binder. Temperatures between 105° F. to about 300° F. for a period of one-half hour to 2 hours serve to adequately remove the solvent during the low-temperature baking period. Thereafter, heating at a temperature above about 450° F. to 700° F. for a period of about several minutes to about 3 hours serves to set the polyimide and remove traces of volatile constituents. Since glassware molds often must be preheated to an elevated temperature prior to installation and use on glassware-producing machines, it is convenient to utilize the production preheating period as the second high-temperature baking period. The low-temperature bake can be shortened without a substantial change in coating quality.

After baking, the composition adheres tenaciously to the mold in a thin, uniform coating of polyimide and with graphite uniformly dispersed therein. Coating thickness may vary considerably between 0.00025 and 0.03 inch, but preferably are held toward the thinner portion of this range, and optimum between 0.002 and 0.004 inch. The coating is thermally stable, oxidation resistant and conducts heat quite well. This latter point is important as explained above in that the heat from the outer surface of the glass must be conducted from the formed article into the mold. Production rates comparable to those utilized with conventional swabbing have been maintained with the lubricous coatings of the instant invention.

In use, the polyimide and graphite dispersion does not contaminate the glass surface to any substantial extent as does the conventional petroleum-graphite swab composition. Accordingly, the efficiency of the glass-production operation, as measured by percent pack, is improved.

Testing of the present invention presented a certain practical problem. Glassware is produced at high-production rates on "Independent Section" machines. These machines involve very complicated mechanical arrangements. Preheating, alignment, timing, etc., of "Independent Section" machines tend to be more an art than a science. With the numerous variables involved, it is most difficult to determine if unsuccessful or marginal attempts are due to normal "start up" problems or to the variable understudy.

On the other hand, it is known that, without swabbing, the conventional mold will not produce glass. Even after initial swabbing, a conventional mold will not continue to produce glassware if not again swabbed within an hour, or more realistically, with 10 to 20 minutes. Thus, from a threshold consideration, any production of glass without initial swabbing and any continued production of glass after 30 to 60 minutes of swabbing indicates an improvement over previous results. Though not every mold tested with the coating of the instant invention produced good glassware or extended runs, it is also true that not every mold used in conventional glassware manufacturing successfully produces glassware.

Because of the extreme conditions and physical abuse necessarily opposed upon molds, and particularly neck ring and follower sets, an average mold life of 24 hours is generally considered to be quite good. Accordingly, the mold lubricants of the instant invention are considered to be completely tested when 24 hours of swab-free operation was obtained. However, lesser periods of trouble-free operation on the order of 8 to 12 hours are considered to be commercially significant. When it is considered that these standards can only be compared to the accepted prior art lubricant, and that the prior art lubricant is workable for perhaps 10 to 30 minutes, it will be recognized that the improvements are most significant.

In the course of testing the present invention, three compositions were prepared as shown in the following TABLE.

TABLE

| Constituent | Percent By Weight | | |
|---|---|---|---|
| | Composition "A" | Composition "B" | Composition "C" |
| Graphite* | 35.5 | 64.5 | 35.5 |
| Antimony Trioxide | 29.0 | None | None |
| Polyimide Resin Solids | 35.5 | 35.5 | 64.5 |

*The graphite used was a Spectro Grade and the polyimide was duPont's Pyralin 4701, provided as 44% by weight of aromatic polyimide precursor in equal parts of N-methylpyrrolidone and xylene solvent.

EXAMPLE I

A blank mold was lightly sandblasted to produce a satin finish, solvent cleaned and coated with Composition "A," while preheated to a temperature of about 200° F., by spraying Composition "A" in about 70% by weight of N-methylpyrrolidone and xylene solvent system through a Binks airbrush sprayer to produce a coating on the blank mold of between 0.0002 and 0.0005 inch thickness. The blank mold was then maintained at about 200° F. for 1 hour to remove most of the solvent, and thereafter heated to about 575° F. for an additional hour to completely cure the composition.

A buffing wheel was employed to burnish the coating surface. After preheating to 700° F., the mold was placed on an "Independent Section" machine and used to produce commercial glassware of the 8 oz. baby food jar type. Without swabbing, the blank mold operated satisfactorily for between 42 and 49 hours. Removal was for unknown reasons and may have been for reasons other than glass sticking to the mold or inadequate lubrication.

EXAMPLE II

A blank mold was lubricated as described in Example I utilizing Composition "A" except that the coated surface was burnished with 2/0 polishing paper. After 48 hours of satisfactory performance without swabbing on an "Independent Section" machine producing 8 oz. baby food glassware, observation of the mold was terminated. It is not known how much longer the mold functioned satisfactorily.

EXAMPLE III

A blank mold was cleaned utilizing a glass bead grit blast and then solvent cleaned. Composition "B" was then thinly coated on the blank mold while the blank mold was maintained at a preheat temperature of about 200° F. by spraying diluted with 70% by weight of equal parts of N-methylpyroolidone and xylene solvents. The blank mold was maintained thereafter at a temperature of 200° F. to evaporate the solvent, and then heated to between about 600° to 650° F. for 1 hour to cure the coating.

While still preheated, the blank mold was mounted on an "Independent Section" machine and utilized without swabbing to produce 8 oz. baby food glassware. The coated mold performed satisfactorily for 17.5 hours to 25 hours before being removed for unknown reasons.

EXAMPLE IV

A blank mold was coated with Composition "C" utilizing the proceedure described in Example III except that the mold surface was also polished with a motor-driven, fine abrasive wheel before coating. The blank mold was used on an "Independent Section" machine to produce 8 oz. baby food glassware without swabbing. Between 8 and 22 hours of satisfactory production was obtained.

EXAMPLE V

A blow mold was coated with Composition "A" in the manner described in Example I except that the cured coating was burnished with 600 grit polishing paper. The mold was then mounted on an "Independent Section" machine and utilized to produce 8 oz. baby food glassware without swabbing of the mold. At least 100 hours of satisfactory service was obtained when observation of the mold was terminated while still producing commercially acceptable glassware.

EXAMPLE VI

A blow mold was coated with Composition "A" in the manner described in Example I with the exception that the lubricant's surface was burnished with 2/0 polishing paper after curing. The blow mold provided more than 100 hours of satisfactory service without swabbing when mounted on an "Independent Section" machine utilized to produce 8 oz. baby food glassware. The mold was performing satisfactorily when observation was terminated.

EXAMPLE VII

A blow mold was coated with Composition "A" in a manner described in Example IV and utilized to produce 8 oz. baby food glassware on an "Independent Section" machine. After 72 hours of satisfactory production of commercial 8 oz. baby food glassware without swabbing, observation of the performance of the mold was terminated.

EXAMPLE VIII

A ring mold and follower ring set was coated as described in Example I with the exception that no polishing of the lubricant's surface was carried out. After being preheated on a gas-heated table, the ring mold and follower ring were mounted on an "Independent Section" machine and utilized to produce 8 oz. baby food glassware. During the production of glassware, the ring mold was lightly swabbed about every 3 hours to determine if improved performance would result from this swabbing. No improvement was observed; and, after about 24 hours, the ring mold was removed due to corner breakage not related to the lubrication of the mold. Such breakage is not unusual and results from fatigue of the mold.

EXAMPLE IX

A ring mold and follower ring set was lubricated and utilized on an "Independent Section" machine in the manner described in Example VIII. About 22 hours of satisfactory performance with swabbing only every several hours was afforded by the coated ring set.

EXAMPLE X

A ring mold and follower ring set was coated as set forth in Example IV with Composition "B." The ring mold set was utilized without swabbing to produce 8 oz. baby food glassware. After more than 72 hours of satisfactory performance, observation of the mold performance was terminated.

EXAMPLE XI

A ring mold and follower ring set was lubricated with Composition "C" in the manner described in Example V. The ring mold set was utilized to produce 8 oz. baby food glassware and provided between 48 and 56 hours of satisfactory performance without swabbing before removal for an unknown reason.

The above experiments were conducted under commercial glassware production conditions. Around-the-clock production schedules precluded careful and detailed observation. Instead, the machine operators were asked to note the removal times for the various treated molds. In some cases, it was learned only that the molds were removed sometime during a shift. Accordingly, the above results include ranges indicating minimum and maximum periods of operation.

Also, the experimental molds were used only on one or two sections of a multisection "Independent Section" glassware production machine. Thus, the glassware was mixed when annealed with glassware produced by conventional swabbing for lubrication. For this reason, no statistically valid figures could be determined for increased "pack." However, it is clearly established that swabbing causes a number of rejects with each swabbing operation as a result of the loose graphite transferring to the glass surface, and since the lubricants of the instant invention operated for quite extended periods, it is believed self-evident that the rejects resulting from transfer of graphite to the glassware surface must have necessarily been essentially avoided. Similarly, frequent swabbing with mold dope or other liquid coats the molds and is often the cause of "check" defects in glassware. Obviously, molds operating without swabbing for the above-described periods are not subject to such temperature variations.

What is claimed is:

1. A method of forming a lubricating and release coating on metal surfaces which come into contact with molten glass for forming glass articles, comprising: applying a dispersion of about 10% and 90% by weight based upon the solids a high temperature, polyimide-forming system having a repeating structural unit represented by the formula:

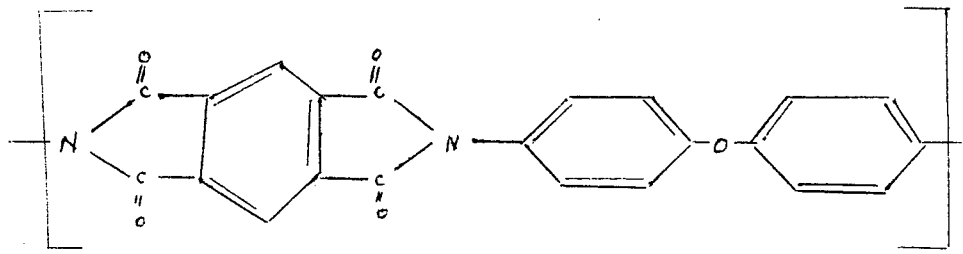

and between about 10% and 90% by weight based upon the solids of graphite having a particle size of about 10 to 200 microns in a liquid carrier to the glass-forming based upon the solids of a polyimide-forming system having a repeating structural unit represented by the formula:

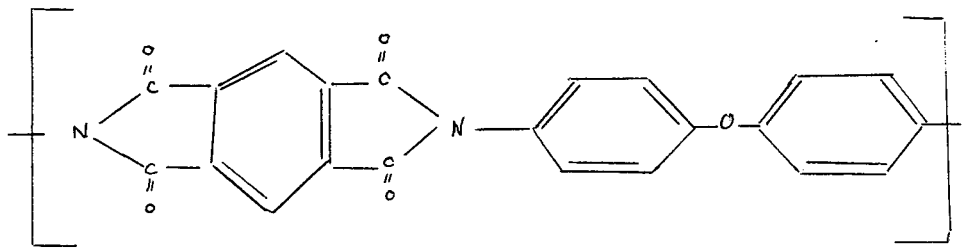

surface and heating for about 0.5 to about 2 hours at between about 105° to 300° F. the surface to remove the carrier and thereafter heating the resulting surface at a temperature about 450° to 700° F., for a period of about several minutes to about 3 hours to form a high temperature, stable polymerized polyimide and admixed graphite coating thereon which is adhered to the glass-forming surface.

2. A method set forth in claim 1, wherein the composition is heated at a temperature between about 575° to 700° F. for a period of between 5 minutes and 3 hours to form the high temperature, stable polymerized polyimide and graphite coating.

3. A method as set forth in claim 1, wherein the coating is burnished after heating.

4. A method as set forth in claim 1, wherein the coating is between about 0.00025 and 0.03 inch thick.

5. A method of forming a lubricating and release coating on metal surfaces which come into contact with molten glass for the forming of glass articles, comprising: admixing between about 10% and 90% by weight with between about 10% and 90% by weight based upon the solids of a particulate graphite having a particle size between 10 and 200 microns, in a liquid carrier, applying the admixed solids to the molding surface, heating the surface and the admixed solids to a temperature between about 105° F. and 300° F. for about 0.5 to 2 hours to remove the carrier and thereafter heating for about several minutes to about 3 hours at a temperature of between about 450° to 700° F. to form an adherent, high temperature, stable polymerized coating on the glass-molding surface which coating is of a thickness between 0.00025 and 0.03 inch.

6. A method as set forth in claim 5, wherein the admixed solids are sprayed onto the glass-molding surface.

7. A method as set forth in claim 5, wherein the temperature stable coating is burnished after heating.

8. A method as set forth in claim 5, wherein the glass-molding surface is precleaned by abrasive blasting before the dispersed solids are applyed to the surface.

* * * * *